Aug. 24, 1926.
R. EGER
POLISHING DEVICE
Filed Jan. 14, 1926
1,597,025
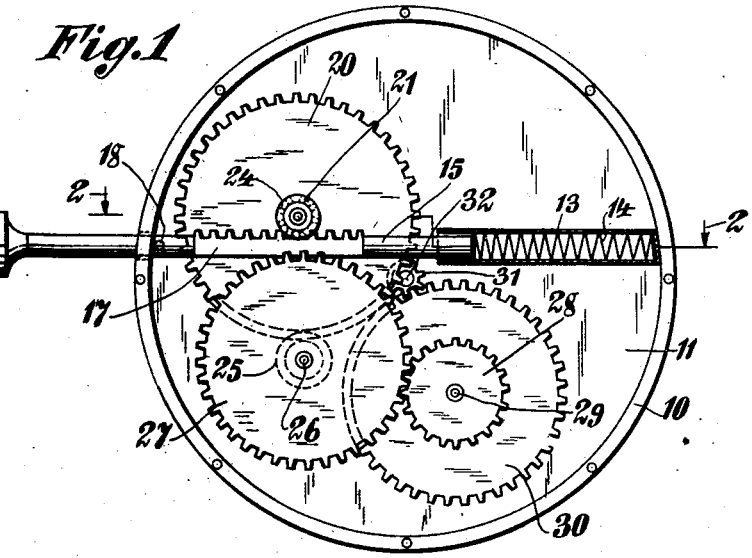
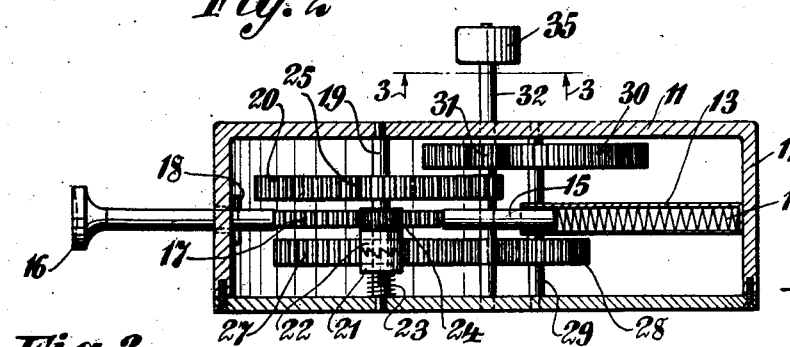
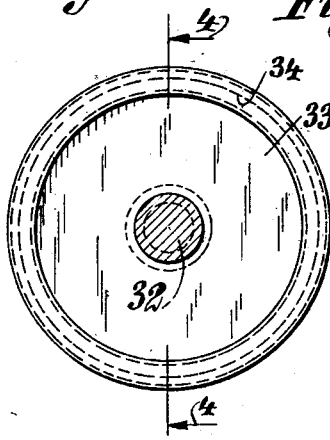
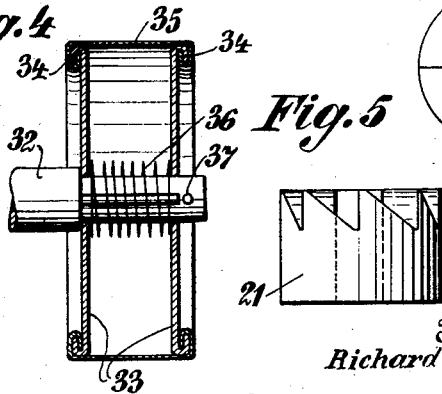
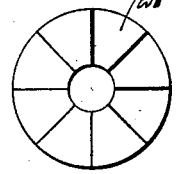
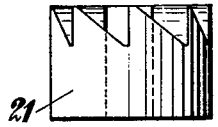
Inventor
Richard Eger.
By his Attorney Patented Aug. 24, 1926.

1,597,025

UNITED STATES PATENT OFFICE.

RICHARD EGER, OF ELIZABETH, NEW JERSEY.

POLISHING DEVICE.

Application filed January 14, 1926. Serial No. 81,170.

This invention relates to manicuring apparatus and more particularly to types for driving nail polishing devices.

One of the objects of the invention is to provide a small compact motor capable of being held in one hand of an operator and actuated by the fingers of the same hand.

A second object is to provide a motor in which the driving spindle is driven at a far higher rate than the prime mover.

A further object is to provide a polishing wheel having means for retaining a band of soft leather in a taut, stretched condition, but permitting the band to yield if held too forcibly against the finger nails to be polished.

These several objects are attained by the novel construction and combination of parts hereinafter described and shown in the accompanying drawing, forming a part hereof and in which:—

Figure 1 is a plan view of a motor as contained within a casing, the cover of which is omitted.

Figure 2 is a transverse sectional view taken on line 2—2 of Figure 1.

Figure 3 is an enlarged sectional view taken on line 3—3 of Figure 2, showing the polishing wheel.

Figure 4 is a cross sectional view of the same taken on line 4—4 of Figure 3.

Figure 5 is a side view of the ratchet clutch in detail.

Figure 6 is a plan view of the same.

As shown in the drawing, the motor is composed of a cylindrical casing 10 having a head 11 at one end a cover plate 12 secured by fastenings as shown.

A tubular socket 13 is fixed in the casing slightly offset from the center and enclosed therein is a coiled compression spring 14 pressing against the entering end of a plunger 15, the same extending outwardly beyond the wall opposite the socket 13, where it is provided with a head 16 adapted to receive the ball of a finger or thumb in operating the device.

Midway in the length of the plunger 15 is a rack 17 and a pin 18 is set in the plunger to limit its outward movement.

Journalled in the head and cover of the casing is a spindle 19 on which is a fixed spur gear 20 and keyed to the spindle is a ratchet clutch element 21, held normally in engagement with a mating member 22 by a compression spring 23.

Formed on the opposite end of the clutch element 22, which is freely rotatable on the spindle, is a pinion 24 engaging the teeth of the rack 17, the arangement being such that when the plunger is pressed inwardly as to rotate the pinion 24, and by means of the clutch transmit motion to the spindle, the element 21 moving outwardly when the plunger is returned by the spring 14, transmitting no motion to the spindle.

The gear 20 meshes with a pinion 25 fixed on a spindle 26 journalled in the casing and fixed on the spindle is a spur gear 27 driving a pinion driving a third spindle 29, on which is secured a gear 30 meshing with a pinion 31 fixed on a spindle 32 mounted axially of the casing and extending through the head 11.

The outer part of the spindle 32 is reduced in diameter and has keyed thereon a pair of spaced discs 33 having re-entrantly flanged edges 34, outturned in opposed relation.

A band 35, of fine leather, charged with crocus or the like, encircles the pair of discs, the edges of the band being turned inwardly to engage between the flanges 34 and outer surfaces of the discs 33, and a coiled compression spring 36, encircling the reduced end of the spindle, presses the discs apart, thereby tensioning the band in a manner which will be apparent.

These discs are removably held on the spindle by a pin 37 so as to permit ready renewal; from the foregoing it will be seen that a serviceable manicuring tool has been disclosed capable of performing polishing operations not easily done by other means.

Having thus described my invention, what I claim as new and desire to secure by Letters Patent, is:—

1. A polishing head comprising in combination with a driving spindle, of a pair of discs slidably engaged on said spindle, said discs having re-entrantly turned flanges disposed in opposite relation, a flexible leather band disposed over said discs and having its edges fixed in said flanges, and resilient means for pressing said discs apart whereby said band is normally retained in a taut position.

2. A polishing device comprising a casing, a spring pressed plunger in said casing, said plunger having a rack portion, a tube in said casing in which said plunger slides, a spring in said tubular element abutting one end of said plunger; a central spindle in said casing, a gear train actuated by said rack to drive said spindle in one direction only, a pair of spaced discs on said spindle, an abrasive leather band engaged on the peripheries of said discs, resilient means for distending said discs, and mean for removably securing said discs on the spindle.

In witness whereof I have affixed my signature.

RICHARD EGER.